United States Patent [19]

Willocks

[11] Patent Number: 4,556,094
[45] Date of Patent: Dec. 3, 1985

[54] FENCE FOR A RADIAL ARM SAW USED AS A DADO CUTTER OR MOLDING CUTTER

[76] Inventor: Calvin B. Willocks, Rte. 4, Box 58, Maryville, Tenn. 37801

[21] Appl. No.: 627,450

[22] Filed: Jul. 3, 1984

[51] Int. Cl.⁴ .............................................. B27C 1/12
[52] U.S. Cl. ............................ 144/253 J; 83/467 R; 83/471.3; 144/134 A; 144/1 R; 409/226
[58] Field of Search .................. 144/1 G, 1 R, 134 A, 144/253 R, 253 J; 83/467, 468, 471.3, 486.1; 409/225, 226, 227

[56] References Cited

U.S. PATENT DOCUMENTS

| | | |
|---|---|---|
| 915,496 | 3/1909 | Sodergrin . |
| 2,782,817 | 2/1957 | Steiner ............................ 144/134 A |

FOREIGN PATENT DOCUMENTS

| | | | |
|---|---|---|---|
| 658709 | 3/1963 | Canada ........................... | 144/134 A |
| 291579 | 6/1953 | Switzerland . | |
| 365831 | 1/1932 | United Kingdom . | |
| 427827 | 5/1935 | United Kingdom . | |
| 1313172 | 4/1973 | United Kingdom . | |

Primary Examiner—W. D. Bray

Attorney, Agent, or Firm—Luedeka & Neely

[57] ABSTRACT

A fence for a radial arm saw used as a dado cutter or molding cutter with the cutting head in a horizontal orientation is disclosed. The fence provides a work surface perpendicular to the saw table surface and includes two fence panels having a thickened lower area for being clamped in the fence slot of the saw table and an adjustable gate panel positioned between the fence panels. An aperture is formed in the gate panel for admitting a work-performing portion of the cutting head. The gate panel is capable of accommodating the various heights of the cutting head by moving between a lower position where the aperture is adjacent to the surface of the saw table and upper position where the aperture is above the table surface. The gate is appropriately secured with the aperture in the desired position for the height of the cutting head. The thickened areas of the fence panels provide clearance for the gate panel to move into the fence slot so that the aperture may be positioned adjacent to the saw table. Only the work-performing portion of the cutting head is exposed and cuts are safely made as the workpiece is guided along the fence and table.

9 Claims, 3 Drawing Figures

FENCE FOR A RADIAL ARM SAW USED AS A DADO CUTTER OR MOLDING CUTTER

The present invention relates to power tool accessories and more particularly relates to a fence for a radial arm saw outfitted with a cutting head to operate as a molding cutter or dado cutter.

Radial arm saws are often used as a dado cutter or a molding cutter by outfitting the saw with an appropriate cutting head. For making cuts in a workpiece extending over a short distance, the saw can be used in its normal configuration with the cutting head rotating in a vertical plane with the cut being made by moving the driving unit along the arm. With the radial arm saw in this configuration, the length of cut is limited by the maximum travel of the driving unit along the arm of the saw.

For other operations such as making long dado cuts, producing molding out of long stock, or other such operations, it is often necessary or desirable to tip the driving unit so that the cutting head rotates in a horizontal plane. The driving head is then generally set in a fixed position and the workpiece is moved in relation to the cutting head to make the cut.

Using the saw having a cutting head in a horizontal orientation is very dangerous with known guards for the cutting head. Typically, these guards are attached to the driving unit and encircle a portion of the cutting head but leave the remaining portion of the driving head fully exposed. When a guard of this type is employed, the cutting head not only has the propensity for causing injury to the operator by direct contact with the cutting head but also chips and debris are thrown in many different directions and may cause injury to the eyes of the operator or on-lookers.

Known guards and the low fence generally used with a radial arm saw limit the versatility of a radial arm saw when the cutting head is oriented horizontally. Generally, the cuts can only be made in a very limited range of vertical distances above the saw table. Moreover, due to the special care needed to prevent injury from contact with the cutting head and the flying chips and debris, a radial arm saw having a horizontally oriented cutting head is extremely difficult to use.

It is accordingly an object of the present invention to provide a fence for a radial arm saw used as a dado cutter or molding cutter which provides for easy and safe operation when the cutting head is in a horizontal position.

It is a further object of the present invention to provide a fence which permits the horizontal cutting head to make cuts ranging from cuts adjacent to the table surface to cuts high above the table surface.

It is another object of the present invention to provide a fence which is usable in conjunction with known guards for a horizontal cutting head to further increase the safety of use.

These and other objects and advantages will become more fully apparent as the following description is read in conjunction with the drawings in which.

Generally, in accordance with the present invention, the fence includes one or more members for providing a work surface which is generally perpendicular to the saw table. Each member includes an upper area for providing the work surface and a lower area for being clamped in a fence slot. Also included in the fence is an adjustable gate in alignment with the work surface having an aperture for admitting a work-performing portion of the cutting head. The gate is continuously movable between a lower position where the aperture is closely adjacent to the table surface and a portion of the gate is below the table surface and an upper position where the aperture is above the table surface. The gate is secured in an appropriate position for the aperture to accommodate a desired height of the cutting head. Because only a portion of the cutting head is exposed, cuts can be safely made as a workpiece is moved along the fence and table to contact the cutting head.

Figure 1:
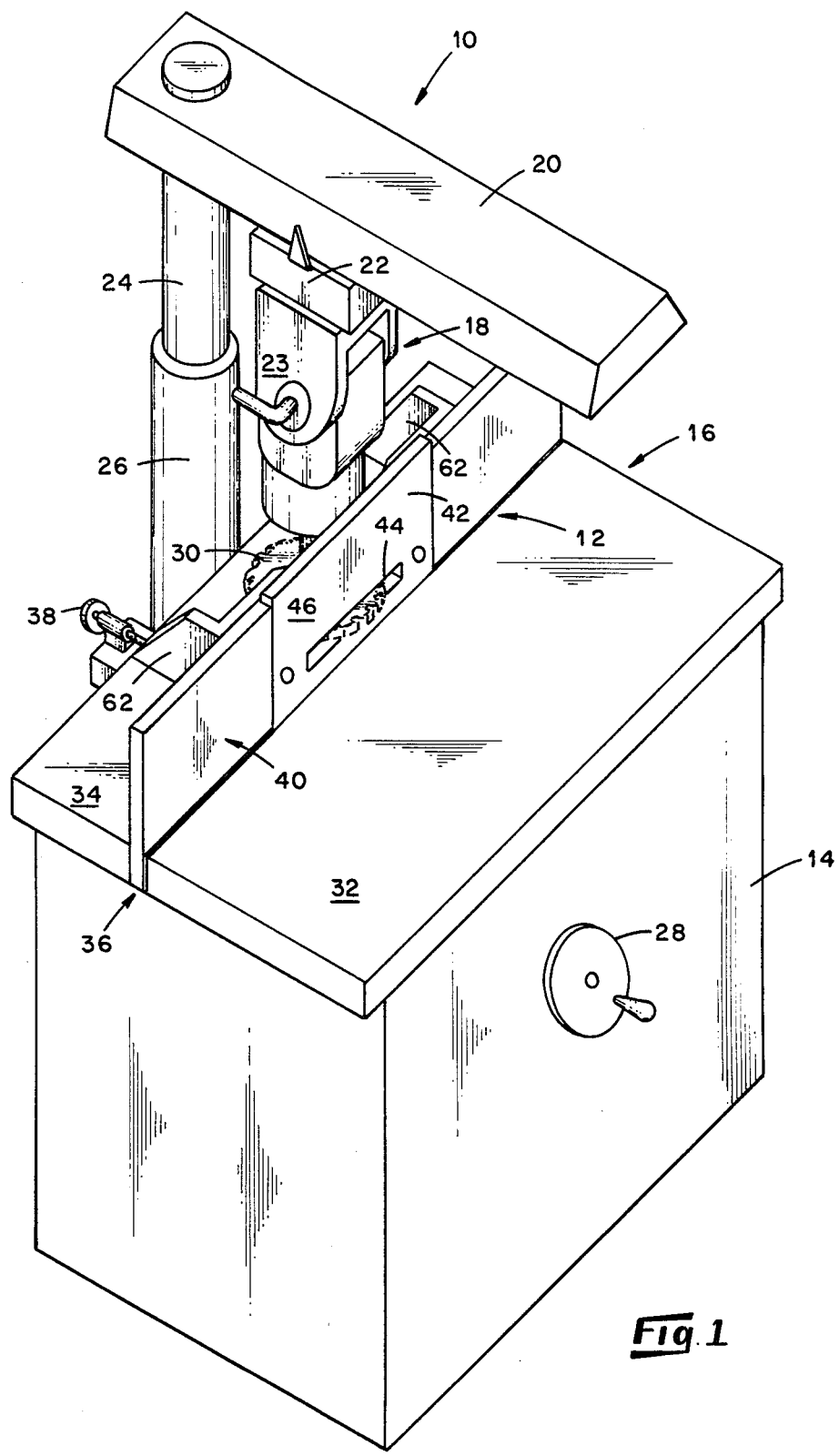
FIG. 1 is an isometric view of a radial arm saw incorporating one form of the fence of the present invention.

Referring now to the drawings in which like reference characters designate like or corresponding parts throughhout the several views, there is shown in FIG. 1 a radial arm saw 10 incorporating one form of the fence 12 of the present invention. The radial arm saw 10 includes a base 14 which supports a table 16. Suspended above the table 16 is the driving unit 18 which is mounted on the arm 20 of the radial arm saw by means of a carriage 22 and yoke 23 attached to the carriage 22 which travel along the underside of the arm 20. The arm 20 is supported by a column 24 and column support 26 which is attached to the base 14. A crank 28, located at a convenient position on the base 14, is operatively connected to the column 24 to raise and lower the column 24 and arm 20 to adjust the height of the driving unit 18 above the table 16.

As shown in FIG. 1, the radial arm saw 10 is outfitted with a cutting head 30 which is in a horizontal orientation. While the cutting head 30 depicted in the drawings is a dado blade it will be understood that the fence 12 of the present invention is equally suitable for use with a molding cutter or other such blade which is operable in a horizontal position. In order for the cutting head 30 to be in a horizontal orientation, the driving unit 18 is tipped in the yoke 23 from its normal orientation with the cutting blade being vertically oriented to the horizontal orientation as shown. The yoke 23 and carriage 22 are provided with appropriate locking devices to maintain the driving unit 18 in a desired fixed position.

The table 16 includes a work table portion 32 which is fixedly attached to the base 14 and table backup strips 34 which are supported by the base 14 but are movable. A fence slot 36 extending generally parallel to the front of the table 16 is provided between the table backup strips 34 and the work table portion 32. The size of the fence slot 36 is adjustable with two thumb screws 38 attached to the base 14 (one of which is shown in FIG. 1) which operate to urge the table backup strips 34 towards the work table portion 32.

Referring still to FIG. 1, the fence 12 is clamped in the fence slot 36 and provides a work surface 40 which is perpendicular to the saw table 16. The fence further includes an adjustable gate 42 having an aperture 44 in the lower interior region of the gate 42 for admitting a work-performing portion of the cutting head 30. The gate 42 may be adjusted so that the aperture 44 may accommodate the head 30 at various heights above the saw table 16.

The work surface 40 is provided by one or more members which are clamped in the fence slot 36 to provide a surface generally perpendicular to the saw table 16. The gate 42 is provided by a member having a face 46 which is oriented to be in alignment with the work surface 40 and the gate is appropriately dimensioned so that a portion of the gate 42 is within the fence slot 36 when the gate 42 is in the lower position. A mechanism is provided for maintaining the face 46 of the gate 42 in alignment with the work surface 40 while allowing the gate 42 to be adjustable for various heights of the cutting head 30. In addition, means are preferably provided to maintain the work surface 40 of the fence 12 in its orientation perpendicular to the table surface when force is applied to the work surface 40.

Figure 2:
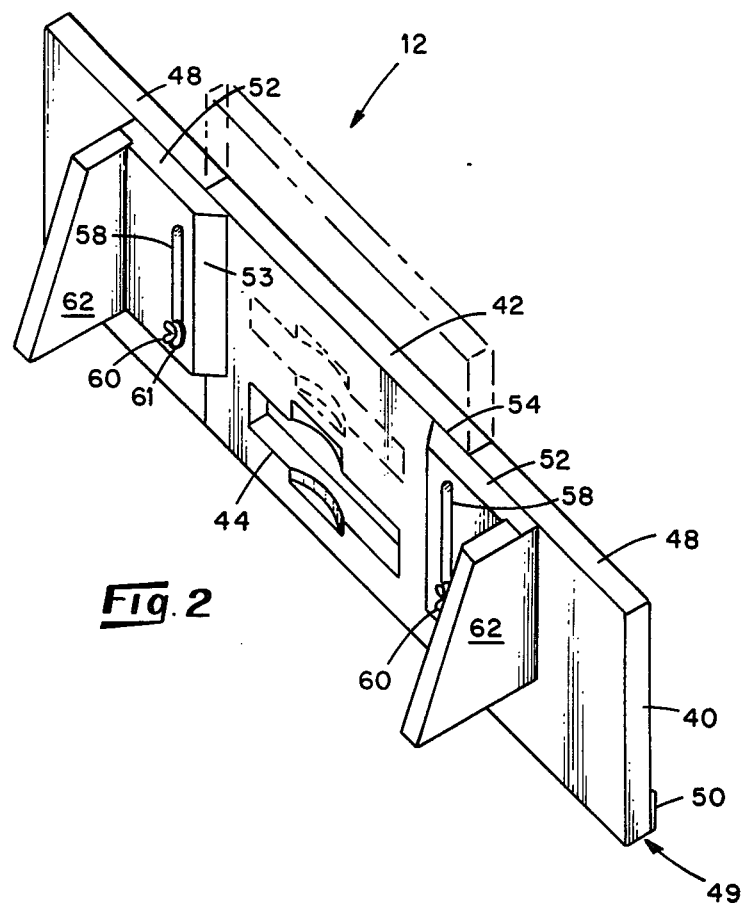
FIG. 2 is a rear isometric view of one form of the fence of the present invention showing a raised position of the gate in broken lines.
Figure 3:
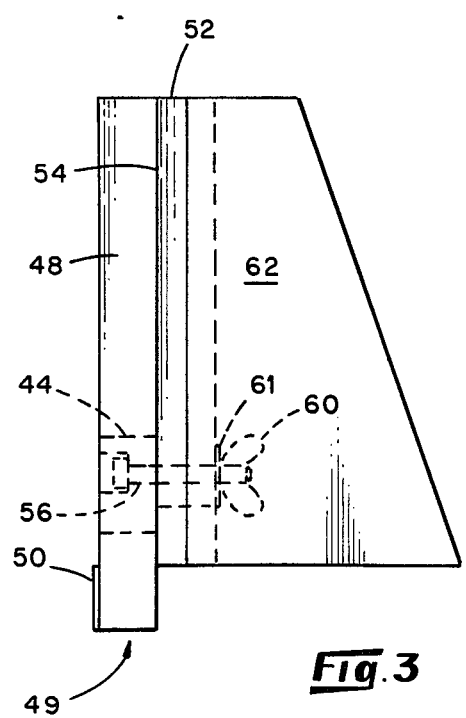
FIG. 3 is an end elevational view of one form of the fence of the present invention.

Referring now more particularly to the drawings, the specific form of the fence illustrated embodies various features of the invention and is shown apart from the radial arm saw 10 in FIG. 2. FIG. 2 shows that the work surface 40 is defined by two fence panels 48 positioned on either side of the gate 42. Satisfactory fence panels 48 are made from wood, metal or plastic having a height ranging from 5-10 inches and thickness ranging from $\frac{1}{2}$ inch up to an inch and having a generally rectangular shape. Alternately, satisfactory panels may also be provided by means of thin panels, e.g., $\frac{1}{8}$ inch or less, having reinforcing structure on the side opposite the work surface 40 and have a suitable area along the lower edge for being clamped in the fence slot. As shown in the embodiment of FIGS. 2 and 3, the side of a fence panel 48 which forms the work surface 40 has a thickened area 49 provided on the portion of the fence panel 48 which are inserted in the fence slot 36. The thickened area 49 causes the support surface 40 to be slightly spaced-apart from the edge of the worktable portion 32. Spacer strips 50, attached to that portion of the fence panels 48 provide a satisfactory thickened area 49. Spacer strips 50 may be provided by a thin strip of wood veneer or other material which has been glued or otherwise attached to the fence panel 48.

In the embodiment shown in FIG. 2, the gate 42 is provided by a wood, metal or plastic panel having a similar thickness and height to the fence panels 48. Alternately, the gate may be a thin panel, e.g., $\frac{1}{8}$ inch or less having reinforcing structure on the reverse side. Because the thickened area 49 determines the size of the fence slot 36 when the fence 12 is clamped in the saw table, the gate 42 having a similar thickness to the fence panels 48 provides a clearance space between the table portion 32 and the face 46 of the gate 42 which permits the gate 42 to move into the fence slot 36.

The aperture 44 in the gate 42 is appropriately shaped and dimensioned to accommodate the desired work-perforating portion of the cutting head 30 while shielding the remaining portions of the cutting head 30 from contact by the operator. Generally, the aperture 44 should be kept as small as possible while still accommodating the work-performing portion of the cutting head 30. Preferably, the aperture tapers from the inside of the gate 42 to the face 46 so that the face 46 is maintained as close to the cutting head as possible. When the gate 42 is made from metal, the aperture is preferably encircled with an insert of a softer material such as wood or plastic to prevent damage to the cutting head 30 should the head contact the gate 42.

In the depicted embodiment of FIGS. 2 and 3, gate support blocks 52 are used to maintain the face 46 of the gate 42 in alignment with the work surface 40 provided by the fence panels 48 and are used to adjustably secure the gate 42 to the fence panels 48. The gate support blocks 52 are constructed of materials similar to the fence panels and gate or may be integrally formed along with the fence panels 48. The gate support blocks 52 extend from the fence panels 48 and overlap the gate 42 to provide gate support faces 54. The gate support blocks, however, do not extend to the bottom of the fence panels 48 so that the thickened area 49 of the fence panels 48 is insertable into the fence slots 36. Preferably, the gate support blocks 52 have angled surfaces 53 adjacent to the gate 42 to provide additional clearance for the driving unit 19. The gate 42 is suitably secured in any position between the upper and lower position by urging the gate 42 into contact with the gate support faces 54. As shown most clearly in FIG. 3, suitable means for urging the gate 42 against the gate support face 54 is provided by bolts 56, the heads of which which are recessed in the face of the gate 42 and extend through the gate into slots 58 formed in the gate support blocks 52 in the area of the gate support faces 54. Preferably, wing nuts 60 and washers 61 are used with the bolts 56 so that the gate 42 may be adjusted quickly.

The work surface 40 fence 12 is preferably maintained in its orientation perpendicular to the table surface with fence support brackets 62 which rest on the table backup strips 34. The fence support brackets 62 are any type of bracket which provides a surface extending from the back of the fence and being perpendicular to the work surface. The brackets 62 are attached to the fence so that the lower area of the fence panels extends into the fence slot 36 at least about $\frac{3}{8}$ inch or so that all of the thickened area 49 is below the table surface. As shown in FIGS. 2 and 3, support brackets are preferably two downwardly sloping blocks which are attached to the gate support blocks 52.

In use, the radial arm saw is outfitted with the desired cutting head 30 and the driving unit 18 is tipped so that the cutting head is in a horizontal position. The driving unit 18 is moved on the carriage 22 so that the driving unit is behind the fence slot 36. The fence 12 of the present invention is placed in the fence slot and the thumb screws 38 are used to move the table backup strip into contact with the fence 12 to clamp the fence 12 in position. The fence support brackets 62 and the gate support blocks 52 support the fence 12 so that it is inserted into the fence slot 36 to the appropriate depth. The appropriate height for the cutting head 30 is chosen by rotating the crank 28. With the wing nuts 60 being loosened, the driving unit 18 is moved towards the rear of the gate 42 and the the gate 42 is moved so that the cutting head 30 extends through the aperture 44 to expose the desired work-performing portion of the blade 30. The wing nuts 60 are then tightened with the gate 42 in the appropriate position. With the carriage is locked in position, the radial arm saw 10 employing the fence 12 of the present invention is operable to safely make dado cuts or to produce molding by moving a workpiece along the work surface 40 of the fence 12 and along the surface of the table 16.

As desired, the driving unit 18 may be adjusted either to change the depth of cut or the height of the cut above the saw table. The gate 42 is easily adjusted by loosening the wing nuts so that the gate 42 may be moved to the appropriate position. Because the gate 42 can move into the fence slot 36, the cutting head 30 of the radial arm saw can be used in a position very close to the table surface. In addition, the gate 42 can be raised to accommodate a cutting head position high above the table surface. The face of the gate 42 provides a support surface adjacent the cutting head 30 when in raised position and thus cuts can be safely made with the cutting head 30 high above the table surface 16.

The construction of the fence of the present invention also permits a conventional guard to be used in addition to the fence 12. Thus, the entire cutting head except for the actual work-performing portion is protected from accidental contact and chips and debris are not expelled in all directions. The fence of the present invention thus enables a radial arm saw to be used safely as a dado cutter or molding cutter when the cutting head is in a horizontal position. Cuts can be made safely at many different levels in relation to the table surface.

Although a particular embodiment of the present invention has been described in the foregoing description, it will be understood that the invention is capable of numerous modifications without departing from the spirit of the invention.

What is claimed:

1. For use with a radial arm saw outfitted with a horizontal cutting head to operate as a dado cutter or molding cutter and having a saw table with an adjustable fence slot, a fence comprising:
    work surface means secured in the fence slot for providing a work surface generally perpendicular to the saw table;
    an adjustable gate having a face in alignment with and continuous with said work surface of said work surface means, said gate having an aperture for admitting the cutting head so that a work-performing portion of the cutting head extends outwardly from said face of said gate, said gate being movable between a first position where said aperture is adjacent to the saw table and at least part of said gate is below the surface of the saw table and a second position where said aperture is above the saw table; and
    means for securing said gate in a selected position between and including said first position and said second position.

2. The fence of claim 1 wherein said work surface means comprises at-least one fence panel having an upper area for providing said work surface and having a lower area for being clamped in the fence slot and said gate comprising a panel having a thickness smaller than the thickness of said lower area of said fence panel whereby, said lower area of said fence panel being clamped in the fence slot provides sufficient clearance for said gate panel to move to said first position where at least a portion of said gate panel is below the surface of the saw table.

3. The fence of claim 1 wherein said work surface means comprises two fence panels and said gate comprises a gate panel, said fence panels being disposed on either side of said gate panel and each of said fence panels having an upper area for providing said work surface and a lower area for being clamped in the fence slot, said gate panel having a smaller thickness than said lower area whereby, said lower areas of said fence panels being clamped in the fence slots provides sufficient clearance for said gate panel to move into said first position where at least a portion of said gate panel is beneath the surface of the saw table.

4. The fence of claim 3 wherein said lower area of said fence panel comprises spacer means for causing said work surface to be spaced-apart from the saw table to provide clearance between said face of said gate panel and said saw table whereby, said gate panel is movable to said first position where at least a portion of said gate panel is below the surface of the saw table.

5. The fence of claim 3 further comprising gate support means for maintaining said face of said gate panel in alignment with said work surface.

6. The fence of claim 5 wherein said gate support means comprises two gate support members each secured to one of said fence panels adjacent to said gate panel, each of said gate support members having an overlapping portion for overlapping part of said gate panel.

7. The fence of claim 6 wherein said gate securing means comprises means for urging said gate panel into contact with said overlapping portion of said gate support members.

8. The fence of claim 7 wherein said means for urging said gate panel into contact with said gate support members comprises an upright slot formed in each gate support member and bolts with wing nuts attached to said gate panel for sliding in said slots and urging said gate panel into contact with said gate support member.

9. The fence of claim 1 further comprising means attached to said work surface means and being supported by the saw table for maintaining said work surface of said work surface means in an orientation perpendicular to the table.

* * * * *

UNITED STATES PATENT AND TRADEMARK OFFICE
CERTIFICATE OF CORRECTION

PATENT NO. : 4,556,094

DATED : December 3, 1985

INVENTOR(S) : Calvin B. Willocks

It is certified that error appears in the above-identified patent and that said Letters Patent is hereby corrected as shown below:

Column 3, line 52, "perforating" should be -- performing --.

Signed and Sealed this

Eighth Day of April 1986

[SEAL]

Attest:

DONALD J. QUIGG

Attesting Officer

Commissioner of Patents and Trademarks